Nov. 29, 1966 C. HINDS 3,288,473
STUFFING BOX

Filed Oct. 9, 1963 3 Sheets-Sheet 1

Cyril Hinds
INVENTOR.

BY *Clarence A. O'Brien*
*and Harvey B. Jacobson*
Attorneys

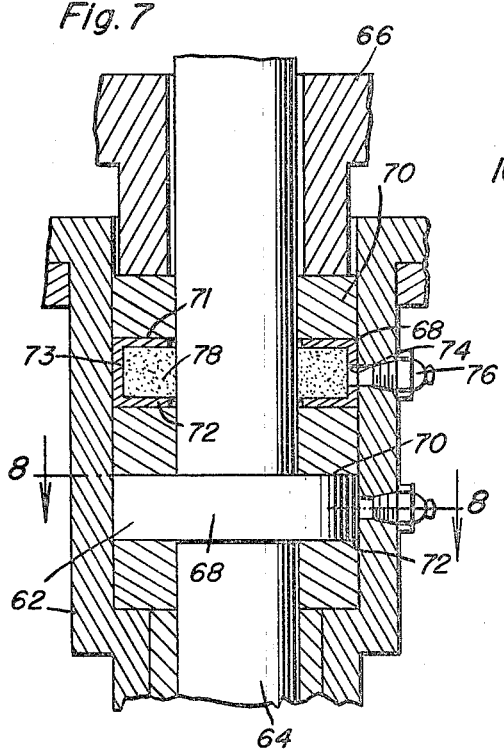
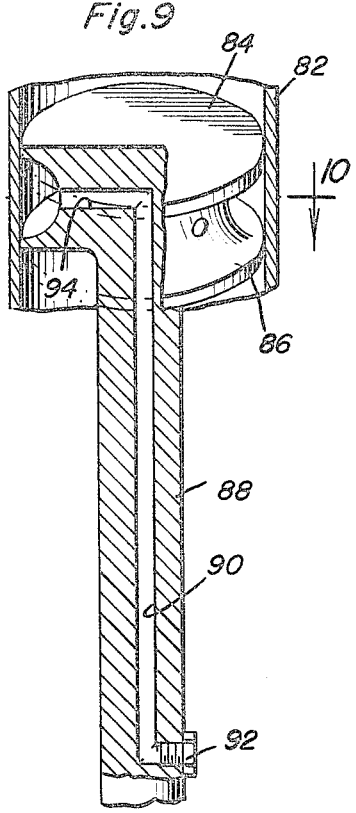
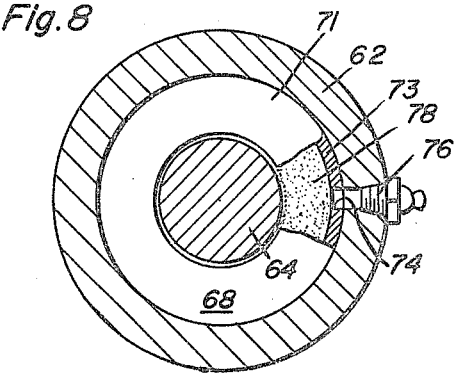
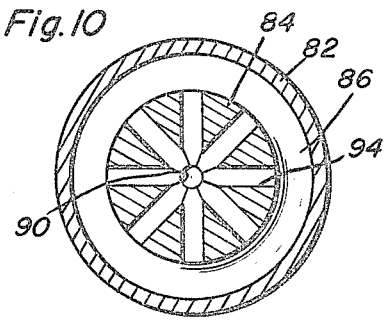
Cyril Hinds
INVENTOR.

Nov. 29, 1966 C. HINDS 3,288,473
STUFFING BOX
Filed Oct. 9, 1963 3 Sheets-Sheet 3

Cyril Hinds
INVENTOR.

BY
Attorneys

United States Patent Office 3,288,473
Patented Nov. 29, 1966

3,288,473
STUFFING BOX
Cyril Hinds, Lafayette, La., assignor to Oil Center Research, Inc., Lafayette, La., a corporation of Louisiana
Filed Oct. 9, 1963, Ser. No. 314,948
2 Claims. (Cl. 277—58)

The present invention generally relates to a novel or improved stuffing box assembly for use with pumps and includes a novel method of packing a gland or stuffing box to contain pressure of fluids either gas or liquid without requiring the use of conventional packing rings and gland nuts.

The present invention has particular relationship to the packing gland or stuffing box that is particularly constructed for use with a combined lubricant and sealing material which material is the subject matter of a copending application and the present construction eliminates the use of conventional packing rings and provides for an effective lubrication and seal of a pump shaft or the like and at the same time provides an effective seal which will be long lasting and incorporates a novel construction of stuffing box to enable the stuffing box and shaft assembly to be effectively employed for a greater period of time without renewal or replacement of any of the components.

An object of the present invention is to provide a stuffing box having a plurality of longitudinally spaced recesses therein communicated with a source of special lubricating and sealing material whereby all of the spaced recesses may form effective seals or alternatively the recesses may form effective seals in sequential relation so that the longevity of the shaft extending through the stuffing box may be materially extended. The present invention has many utilities such as in use on stuffing boxes on centrifugal type rotating impeller pumps, reciprocating pumps, valve stems, piston seals on reciprocating pumps and in any other use where a combined lubricant and sealant is required.

A very important object of the present invention is to provide a stuffing box assembly or packing or sealing assembly in which the material forming the sealant may be supplied or replenished while the machinery is in motion thereby in some instances completing reducing down time which is required to replace normal stuffing box packing rings. Pumps or the like may be constructed to specifically receive the flowable lubricant and sealant or a stuffing box adapter may be employed for positioning in existing pumps to enable the flowable lubricant and sealant to be packed.

A further object of the present invention is to provide a stuffing box arrangement or packing or sealing arrangement for a movable shaft, plunger or rotating or reciprocating element which may be used in various types of shaft supporting and sealing arrangements. For example, the assembly of the present invention may be effectively used in boats such as in river tugs or other boats for sealing the propeller shaft where it extends through the hull which will effectively lubricate and seal the shaft. This will greatly extend the useful life of the propeller shaft in a boat which quite often is constructed of relatively expensive material such as Monel and the present invention will effectively reduce the scoring and wear on such a shaft.

Another object of the present invention is to provide a stuffing box or packing assembly which may be used in various types of valves such as gate valves, stopcocks and the like for both low and high pressure use and for use in conjunction with various types of fluids including liquids and gases having various characteristics inasmuch as the present invention will be substantially wear free and long lasting.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 7 is a longitudinal, vertical sectional view illustrating another form of the present invention;

FIGURE 8 is a transverse, sectional view taken substantially upon a plane passing along section line 8—8 of FIGURE 7 illustrating further structural details of this embodiment of the invention;

FIGURE 9 is a fragmental sectional view illustrating a reciprocating plunger received in a cylinder with the concepts of the present invention incorporated therein;

FIGURE 10 is a transverse, sectional view taken substantially upon a plane passing along section line 10—10 of FIGURE 9;

Figure 1:
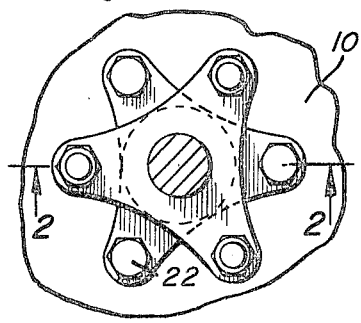
FIGURE 1 is an end view of the packing assembly of a pump illustrating a removable packing element attached to the casting of the pump together with a packing gland adjustably attached to the stuffing box.
Figure 4:
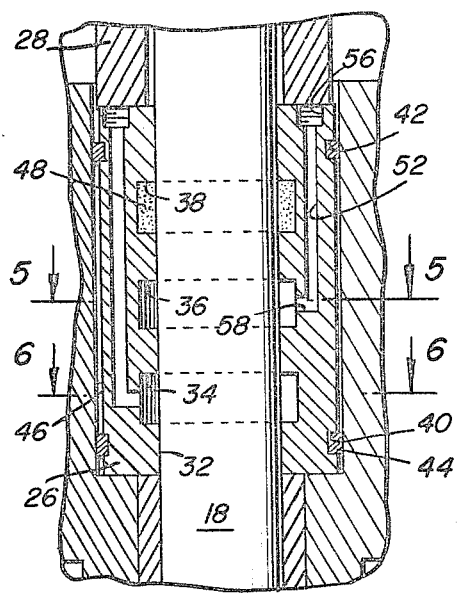
FIGURE 4 is a longitudinal, detailed sectional view illustrating the stuffing box adapter incorporating the concepts of the present invention therein.
Figure 2:
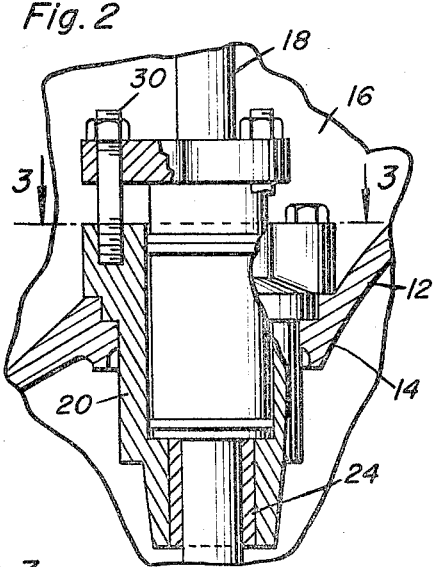
FIGURE 2 is a longitudinal, sectional view taken substantially upon a plane passing along section line 2—2 of FIGURE 1 illustrating the construction of the stuffing box of the pump and the packing gland.
Figure 5:
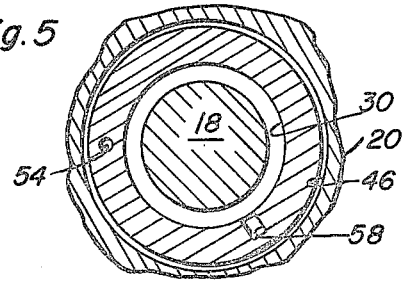
FIGURE 5 is a transverse, sectional view taken substantially upon a plane passing along section line 5—5 of FIGURE 4 illustrating further structural details of the invention.
Figure 6:
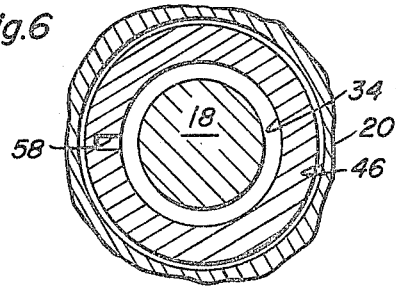
FIGURE 6 is a transverse, sectional view taken substantially upon a plane passing along section line 6—6 of FIGURE 4 illustrating further structural details of the invention.
Figure 3:
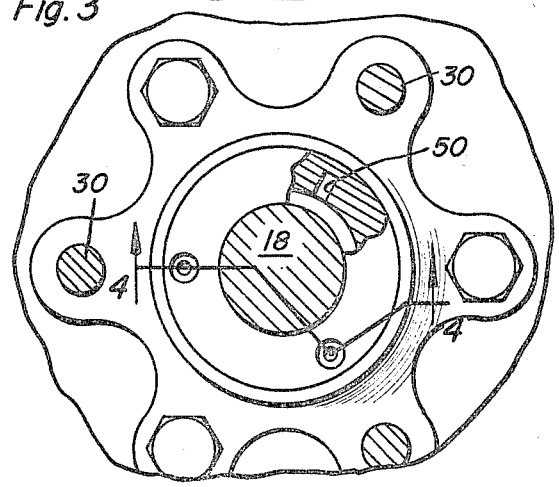
FIGURE 3 is a transverse, sectional view taken substantially upon a plane passing along section line 3—3 of FIGURE 2 illustrating further details of the pump assembly.

Referring now specifically to FIGURES 1-3, a conventional pump assembly 10 is illustrated in which there is a casting 12 dividing the propeller chamber 14 from the open chamber 16 with the pump shaft 18 extending through an opening in the casting 12 and with there being provided a removable stuffing box member 20 in the casting 12 and being retained therein by suitable bolts 22 so that the stuffing box 20 may be removed if desired. The stuffing box 20 is provided with a suitable bearing 24 for supporting the shaft 18 in a conventional manner. The particular construction of the pump and the stuffing box therein is immaterial to the present invention inasmuch as a stuffing box may be an integral member or may be a separable and replaceable element. In this embodiment of the invention, the conventional packing rings such as chevron packing rings are removed from the stuffing box 20 and an inserted adapter 26 is placed therein and held in position by the packing nut 28 which is secured to the stuffing box 20 adjustably by a fastening bolt 30 in a conventional manner.

The insert or adapter 26 is generally of cylindrical configuration and encircles the pump shaft 18 in an obvious manner. The internal surface of the longitudinal bore 32 in the adapter 26 is provided with three annular grooves 34, 36 and 38 which are longitudinally spaced in relation to each other. The external periphery of the insert adapter 26 is provided with a pair of longitudinally spaced grooves 40 and 42 which receive sealing rings 44 or the like which may be conventional O-rings which sealingly engage with the internal surface of the stuffing box 20. There is a small space 46 between the interior of the stuffing box and the exterior of the insert adapter 26 and this space 46 allows insertion of the adapter 26 and O-rings 44 seal this space. A flowable combined lubricant and sealant 48 is received in longitudinal passageways 50, 52 and 54 with the passageway 50 communicating with the groove 38 and the passageway 52 communicating with the groove 36 and the passageway 54 communicating with the groove 34 and each of the passageways extends to and communicates with the top surface of the insert adapter 26 and is provided with a screw-threaded enlargement 56 for receiving the discharge nozzle of a suitable pump or the like for forcing the lubricating and sealing material 48 into the various passageways.

Each of the passages 50, 52 and 54 terminates in an inwardly extending portion 58 communicating with the grooves 38, 36, and 34 respectively.

The construction of the embodiment of the invention as illustrated enables the groove 38 to be initially employed as a sealing and lubricating groove and after the shaft has worn to such an extent that an ineffective seal is provided, the intermediate groove 36 may then be provided with a supply of combined lubricant and sealant 48 through the pasageway 50 by connecting a suitable pressure source to the screw-threaded enlargement 56 which may be orientated in a manner that access can be gained thereto without removing the packing 28. This may be accomplished in several different manners including the use of a special packing nut having passageways aligned with and communicated with the passages 50, 52 and 54 respectively so that the material may be pumped into the insert adapter without removing the packing nut.

If the pump is constructed as an original assembly, the stuffing box may be provided with radial passageways communicating with the annular grooves and each radial passageway may have a fitting on the outer end thereof or a manifold may be attached to all of the grooves depending upon whether a single groove is to be provided with lubricant and sealant or if all three grooves are to be provided with lubricant or sealant at the same time. Also, it is pointed out that the grooves may have parallel top and bottom walls or the walls thereof may be inclined outwardly and towards each other to provide somewhat of a wedging action to the combined lubricant and sealant 48 for purposes of more effectively sealing and lubricating the shaft. When used in combination with a rotating shaft, the sequential pressuring of the grooves is effective for extending the longevity of the shaft inasmuch as three separate areas on the shaft may be engaged by the lubricant and sealant before the shaft needs to be refinished or replaced. On a reciprocating type of shaft, the combined sealant and lubricant may be placed in all three grooves at the same time thereby effectively providing a seal and effectively lubricating the shaft for further extending the effective life thereof without replacement or repair.

FIGURES 7 and 8 illustrate another form of the invention including a stuffing box 62 receiving a pump shaft 64 and including a packing nut 66 all conventionally arranged. In this form of the invention instead of using a single packing, sealing and bearing element, several ring type elements 68 are used. The elements 68 are interposed between spacer rings 70 of metal, plastic or the like and each of the elements 68 includes upper and lower flanges 71 and 72 interconnected by an intermediate peripheral wall 73 having an aperture 74 therein for communicating the interior of channel shaped element 68 with a fitting 76 whereby a packing, sealing and bearing composition 78 may be injected into the space between the flanges 71 and 72 of the elements 68.

FIGURES 9 and 10 illustrate another embodiment of the invention including a cylinder 82 having a reciprocating plunger or piston 84 therein provided with a peripheral groove 86 which may be conveniently of semi-circular cross sectional configuration. A rod 88 is formed integral with the piston or plunger 84 and is provided with a longitudinal passageway 90 therein having a fitting 92 enabling the passageway 90 to be connected with and communicated with a flexible hose forming a source for pressurized lubricant and sealant material. The end of the passageway 90 disposed witthin the plunger 84 is provided with a plurality of radial branches 94 which communicate with the peripheral groove 86 thereby enabling the combined lubricant and sealant to be pumped into the groove 86 thereby sealingly engaging the interior or the cylinder 82 for lubricating and sealing the plunger 84 therein.

FIGURES 11–14 illustrate another embodiment of the invention including a stuffing box 100 receiving a pump shaft 102 and including an internally threaded counterbore 104 therein having a plurality of spiral grooves 106 incorporated therein with the grooves having a pressure fitting 108 communicated therewith. An externally threaded adapter 110 is threaded into the internally threaded stuffing box 100 and is provided with a polygonal head 112 at the upper end thereof together with a seal ring 114 between the head and the end of the stuffing box 100.

The externally threaded insert 110 is provided with longitudinal grooves 116 extending along the exterior surface thereof in communication with the spiral grooves 106 whereby the combined lubricant and sealant will be communicated with the longitudinal grooves 116. The interior bore 118 of the externally threaded member 110 is provided with a plurality of annular grooves 120 spaced longitudinally therein with each of the grooves being communicated with a longitudinal groove or passageway 116 by a plurality of small openings 122 of a radial nature which communicate each of the grooves 120 with the longitudinal grooves 116 thereby enabling the pressurized lubricant and sealant to be received within the grooves 120 for sealing and lubricating engagement with the shaft 102.

While the various embodiments of the invention have been specifically described as being used in combinations with pumps having either rotating or reciprocating shafts or reciprocating plungers or the like, it is pointed out that the present invention may be employed in many and varied uses such as in use with the stems of reciprocating or rotating valves or in combination with boat propeller shafts where the propeller shafts extend through the hull or wherever desired in supporting a shaft where a combined lubricating and sealing feature is desirable. By varying the characteristics of the lubricating and sealing material, the present invention enables pressures of relatively high character or relatively low character to be effectively sealed by incorporating the basic principles of the present invention which enable the sealing material to be replenished or supplied while the machine is in motion without requiring any down time which is extremely important in certain industrial operations as well as in operations which require constant operation.

The material may also be incorporated into flanged couplings, swivel joints, various types of stuffing box arrangements, valve stems, propeller shafts for boats, various rotating and reciprocating shaft assemblies where a sealant and lubricant is desired. The fittings for the lubricant and sealant may be of any suitable type including a grease cup type including a valve or not and the fitting may be of the type to receive a suitable pressure type gun for enabling the supply of the sealant and lubricant to be replenished or supplied.

Figure 11:
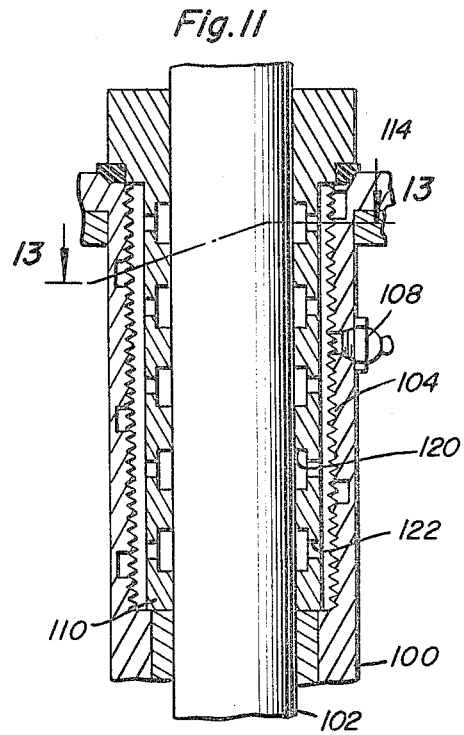
FIGURE 11 is a longitudinal, sectional view of another embodiment of the present invention.
Figure 14:
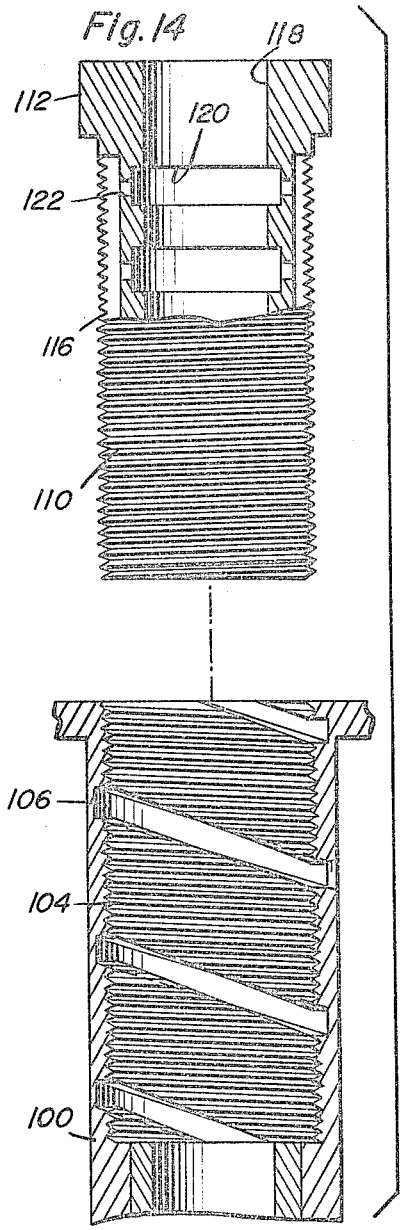
FIGURE 14 is an exploded group view of the construction of FIGURE 11 with parts in section.
Figure 12:
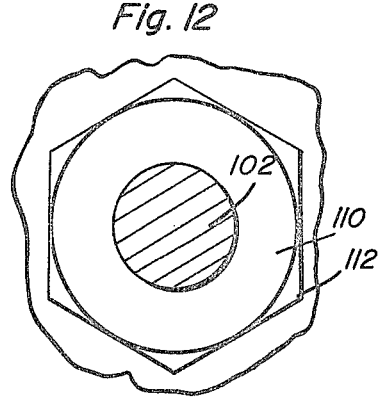
FIGURE 12 is an end view of the construction of FIGURE 11.
Figure 13:
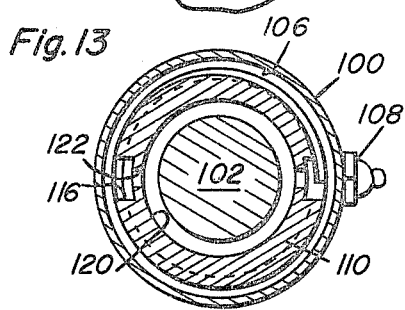
FIGURE 13 is a transverse, sectional view taken substantially upon a plane passing along section line 13—13 of FIGURE 11.

A packing, sealing and bearing element such as shown in FIGURE 11 can also be used in lieu of a conventional bearing in each place where a conventional bearing is used on the long vertical shaft of a turbine type or volute pump such as is commonly used in irrigation and other large volume water wells. The packing, sealing and bearing composition would be replenished in the packing, sealing and bearing elements by extruding the composition through a small common pipe communicating with each packing, sealing and bearing element and having a suitable fitting at the surface.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. In combination with a pump housing having a cylindrical stuffing box chamber formed therein with a constant internal diameter and communicating with the surface of the housing, a pump shaft of constant external diameter extending concentrically of the stuffing box chamber, a cylindrical sleeve having a constant internal and external diameter throughout its length disposed in the stuffing box chamber in encircling relation to the shaft with one end of the sleeve bottoming against the inner end of the stuffing box chamber, retaining means engaging the other end of the sleeve and holding the sleeve against the bottom of the stuffing box chamber, means sealing the exterior surface of the sleeve with respect to the stuffing box chamber at longitudinally spaced points therealong, the interior surface of the sleeve having a plurality of longitudinally spaced grooves therein, lubricating and sealing material filling said grooves, an independent passage in said sleeve communicating independently with the grooves for supplying the lubricating and sealing material thereto, each passage extending longitudinally of the sleeve and communicating with the outer end thereof, said retaining means for the sleeve overlying and closing the open end of the passages and being in the form of an annular member engaging the outer end of the sleeve thus simultaneously closing off all of the passages.

2. The structure as defined in claim 1 wherein each passage where it communicates with the other end of the sleeve includes an internally threaded end portion for receiving a device for supplying the lubricating and sealing material, the thickness of the retaining means being substantially equal to the thickness of the sleeve for sealing the passages.

References Cited by the Examiner

UNITED STATES PATENTS

| | | |
|---|---|---|
| 1,844,903 | 2/1932 | Quenn. |
| 2,244,054 | 6/1941 | Cornell _____ 277—58 |
| 2,410,291 | 10/1946 | Kinzbach. |
| 2,486,939 | 11/1949 | Freund _____ 277—105 X |
| 2,504,936 | 4/1950 | Payne _____ 277—72 |
| 2,624,601 | 1/1953 | Else. |
| 2,660,458 | 11/1953 | Collins et al. _____ 277—58 |
| 2,726,882 | 12/1955 | Ryant _____ 277—58 |
| 3,095,004 | 6/1963 | Jackson et al. _____ 137—246.11 |

FOREIGN PATENTS

| | | |
|---|---|---|
| 1,176,332 | 11/1958 | France. |
| 368,871 | 3/1932 | Great Britain. |

LAVERNE D. GEIGER, *Primary Examiner.*

SAMUEL ROTHBERG, *Examiner.*

L. RANEY, J. MEDNICK, *Assistant Examiners.*